Nov. 13, 1928.
F. J. CHARLEBOIS ET AL
1,691,639
STAKE FOR VEHICLE SIDE BOARDS
Filed Jan. 19, 1928
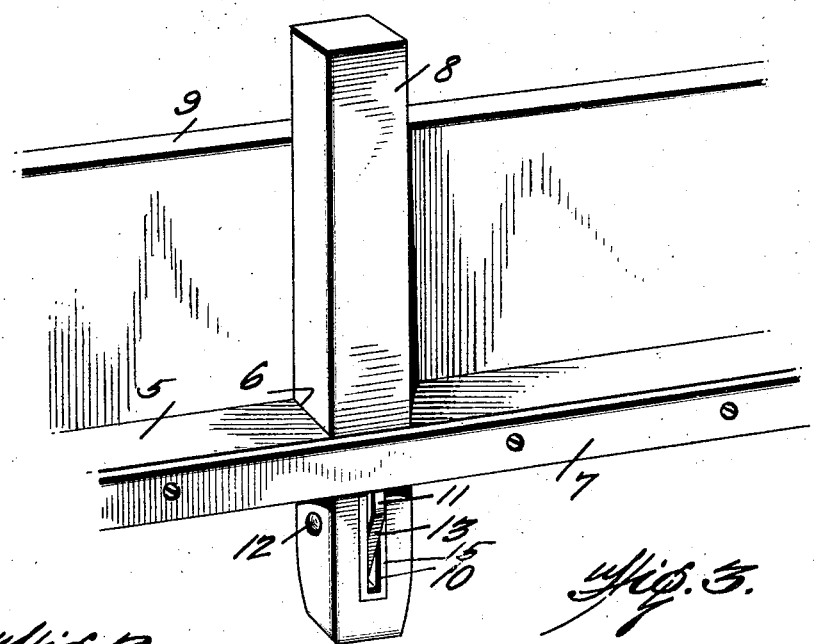
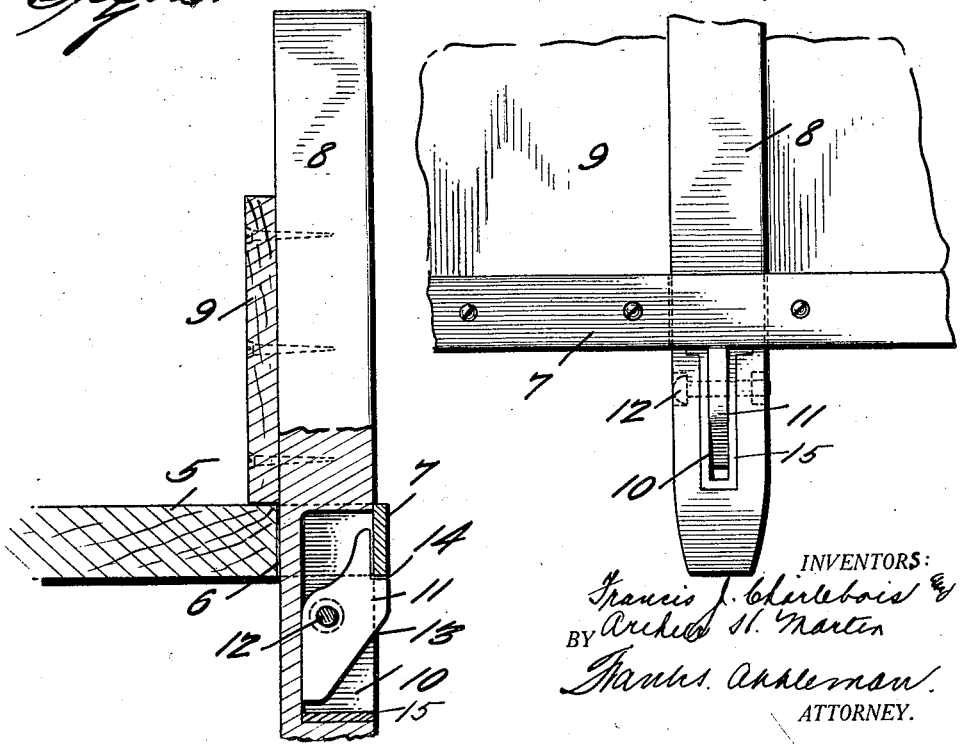
INVENTORS:
Francis J. Charlebois &
BY Archie St. Martin
Frank Ansleman
ATTORNEY.

Patented Nov. 13, 1928.

1,691,639

UNITED STATES PATENT OFFICE.

FRANCIS J. CHARLEBOIS AND ARTHUR H. MARTIN, OF NORWOOD, NEW YORK.

STAKE FOR VEHICLE SIDEBOARDS.

Application filed January 19, 1928. Serial No. 247,949.

This invention relates to stakes associated with the side boards or sides of vehicle bodies, and has for an object the provision of novel means for removably securing such stakes in assembled relation to the body or to cross beams of such bodies, the same being effective to prevent upward movement of the stakes with respect to the floor of the body or to the parts to which they are anchored.

It is a further object of this invention to provide a stake latch which will permit the stake to be inserted in its socket without manipulation of the latch, the said latch being so formed as to automatically assume a position which will prevent the displacement of the stake until the said latch is manipulated.

With the foregoing and other objects in view, the invention consists in the details of construction and in the arrangement and combination of parts to be hereinafter more fully set forth and claimed.

In describing the invention in detail, reference will be had to the accompanying drawings forming part of this application, wherein like characters denote corresponding parts in the several views, and in which—

Figure 1 illustrates a perspective view of a fragment of a vehicle floor with a stake and side board embodying the invention applied thereto;

Figure 2 illustrates a sectional view through the said stake, board and floor; and Figure 3 illustrates a view in elevation of the said device.

In these drawings, 5 denotes a floor of a vehicle body having a socket 6, and it will be understood that a number of such sockets may be employed in the length of such vehicle body. If desired, the extended floor might be omitted and the usual cross beams employed having sockets, such as 6, but as these expedients are so well known in the art and are exemplified in the disclosure of Patent No. 1,368,907 of February 15, 1927, it is believed unnecessary to specifically show the cross beam having a socket.

In the present embodiment of the invention, a facing strip 7 constitutes one wall of the socket into which the stake 8 of the side board 9 is inserted.

In order to retain the stake against displacement, the said stake is provided with a recess 10 in which a latch or detent 11 is mounted on a pivot 12. The latch has a beveled outer edge 13 which constitutes a cam when it engages the upper edge of the wall of the socket and this serves to swing the latch on its pivot in order that it will permit the stake to slide into its seat. That portion of the latch above the camming edge 13 projects a suitable degree beyond the pivot and its weight is sufficient to cause it to swing outwardly at the top after the edge of the latch has passed the lower wall of the socket, so that through gravity the latch is set in operative position, and the shoulder 14 thereof, which extends under the lower edge of the socket, will engage the edge of the socket and prevent upward movement of the stake, until, of course, the latch is manually operated to force the upper end into the recess formed for the reception of the said latch.

The sockets 6 will each preferably be provided with a metal housing 15 which is preferably galvanized to prevent corrosion and the said housing with the latch mounted therein will constitute a complete unit which can be readily installed on body structures. The housing will serve to prevent binding of the operating parts of the device which might result through expansion of wooden structures, due to the presence of water or moisture.

The device has proven efficient and satisfactory in use and it is comparatively inexpensive to install and maintain.

We claim:

A stake for vehicle side boards and the like comprising an element having a laterally disposed recess in its edge near the lower end, a housing in the recess, a body structure having a socket for the stake, a latch in the housing, means for pivoting the latch therein, the said latch having an edge projecting beyond the edge of the stake under the structure having the socket, the said latch having an outer camming edge adapted to engage the structure having the socket for forcing the latch inwardly at the top, the said latch having weight above the pivot to cause its gravitation into operative relation with the under surface of the structure having the socket and means for limiting the swinging motion of the latch.

FRANCIS J. CHARLEBOIS.
ARTHUR H. MARTIN.